US012633633B2

United States Patent

(12) United States Patent
Wu et al.

(10) Patent No.: US 12,633,633 B2
(45) Date of Patent: May 19, 2026

(54) PHASE SHIFTER COMPRISING SIGNAL AND REFERENCE ELECTRODES ON A SUBSTRATE, WHERE THE REFERENCE ELECTRODES INCLUDE SUB-ELECTRODES SEPARATED BY GAPS SPANNED BY MEMBRANE BRIDGES

(71) Applicants: Beijing BOE Technology Development Co., Ltd., Beijing (CN); BOE TECHNOLOGY GROUP CO., LTD., Beijing (CN)

(72) Inventors: Qianhong Wu, Beijing (CN); Jingwen Guo, Beijing (CN); Chunxin Li, Beijing (CN); Jianxing Liu, Beijing (CN); Feng Qu, Beijing (CN); Biqi Li, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 408 days.

(21) Appl. No.: 18/029,142

(22) PCT Filed: Apr. 29, 2022

(86) PCT No.: PCT/CN2022/090485

§ 371 (c)(1),
(2) Date: Mar. 29, 2023

(87) PCT Pub. No.: WO2023/206430

PCT Pub. Date: Nov. 2, 2023

(65) Prior Publication Data

US 2024/0363987 A1 Oct. 31, 2024

(51) Int. Cl.
*H01P 1/18* (2006.01)

(52) U.S. Cl.
CPC ................ *H01P 1/184* (2013.01); *H01P 1/18* (2013.01)

(58) Field of Classification Search
CPC .................................. H01P 1/184; H01P 1/18
(Continued)

(56) References Cited

U.S. PATENT DOCUMENTS 7,259,641 B1 * 8/2007 Weller et al. ........... H01P 1/184 333/156
2004/0155729 A1 8/2004 Ko et al.
(Continued)

FOREIGN PATENT DOCUMENTS

CN 104993193 A 10/2015
CN 111786058 A 10/2020
CN 215497017 U 1/2022

OTHER PUBLICATIONS

Liu et al., "Fabrication of a Tunable Capacitor with a Non Planar Plate by Using Titanium and Polyimide as Sacrificial Layers," Conference Paper, Jan. 27, 2019, pp. 863-866, 32nd IEEE International Conference on Micro Electro Mechanical Systems, Seoul, Korea.
(Continued)

*Primary Examiner* — Benny T Lee
(74) *Attorney, Agent, or Firm* — HOUTTEMAN LAW LLC

(57) ABSTRACT

A radio frequency device and an electronic device are provided. The radio frequency device includes: a first dielectric substrate and at least one phase shift unit, each including a signal electrode and a first and second reference electrodes; first and/or second reference electrodes include reference sub-electrodes arranged side by side, and first gaps between every two adjacent reference sub-electrodes; the signal electrode includes a main structure between the first and second reference electrodes and branch structures elec-
(Continued)

trically connected to the main structure, and each branch structure extends into one corresponding first gap; the radio frequency device further includes membrane bridges on a side of a first insulating layer away from the first dielectric substrate, and a first insulating layer covering the branch structures, each membrane bridge spans one corresponding first gap, and a bridge floor of each membrane bridge and the first insulating layer have a first distance therebetween.

20 Claims, 7 Drawing Sheets

(58) Field of Classification Search
USPC .......................................................... 333/161
See application file for complete search history.

(56) References Cited

U.S. PATENT DOCUMENTS

2022/0231392 A1* 7/2022 Guo et al. ................. H01P 1/18
2022/0311112 A1* 9/2022 Wang et al. ............ H01P 1/184

OTHER PUBLICATIONS

Puyal, et al., "RF MEMS phase shifters for wireless applications," in Handbook of MEMS for Wireless and Mobile Applications, 2013, Chapter 5, pp. 136-175, Woodhead Publishing Limited.

* cited by examiner

PHASE SHIFTER COMPRISING SIGNAL AND REFERENCE ELECTRODES ON A SUBSTRATE, WHERE THE REFERENCE ELECTRODES INCLUDE SUB-ELECTRODES SEPARATED BY GAPS SPANNED BY MEMBRANE BRIDGES

TECHNICAL FIELD

The present disclosure relates to the field of communication technology, and in particular to a radio frequency device and an electronic device.

BACKGROUND

With the rapid development of the information age, a wireless terminal with high integration, miniaturization, multifunction, and low cost has gradually become a trend of the communication technology. A phase shifter is an essential key component in communication and radar applications. The traditional phase shifter mainly includes a ferrite phase shifter or a semiconductor phase shifter. The ferrite phase shifter has a larger power capacity and a low insertion loss, but is limited in large-scale applications due to a complex process, a high manufacturing cost, a large footprint or the like. The semiconductor phase shifter has a small footprint, a high operating speed, but has a smaller power capacity, a larger power consumption and a high process difficulty.

Compared with the traditional phase shifter, a micro-electro-mechanical system (MEMS) phase shifter in the prior art has significant advantages in the aspects of an insertion loss, a power consumption, a footprint, a cost and the like, and has attracted a wide attention in the field of the radio communication technology, the microwave technology or the like.

SUMMARY OF THE INVENTION

The present disclosure is directed to at least one of the technical problems in the prior art, and provides a radio frequency device and an electronic device.

In a first aspect, an embodiment of the present disclosure provides a radio frequency device, including: a first dielectric substrate, and at least one phase shift unit on the first dielectric substrate; wherein each phase shift unit includes a signal electrode, a first reference electrode, a second reference electrode on the first dielectric substrate: at least one of the first reference electrode and the second reference electrode includes a plurality of reference sub-electrodes arranged side by side, and first gaps between every two adjacent reference sub-electrodes; and the signal electrode includes a main structure and branch structures electrically connected to the main structure, the main structure is between the first reference electrode and the second reference electrode, and each branch structure extends into one corresponding first gap: the radio frequency device further includes a plurality of membrane bridges, and a first insulating layer covering the branch structures, the plurality of membrane bridges are on a side of the first insulating layer away from the first dielectric substrate, each membrane bridge spans one corresponding first gap, and a bridge floor of each membrane bridge and the first insulating layer have a first distance therebetween in a direction perpendicular to the first dielectric substrate.

In some embodiments, an orthographic projection of the first insulating layer on the first dielectric substrate covers a portion where an orthographic projection of each reference sub-electrode on the first dielectric substrate overlaps with an orthographic projection of the corresponding membrane bridge on the first dielectric substrate.

In some embodiments, at least a part of the plurality of membrane bridges are connected to different control signal lines.

In some embodiments, the bridge floor of each membrane bridge includes a connection portion, and a first end and a second end connected at opposite ends of the connection portion; and orthographic projections of the first end and the second end on the first dielectric substrate are within orthographic projections of corresponding two reference sub-electrodes on the first dielectric substrate, respectively: orthographic projections of a long side of the first end and a short side of one of the two reference sub-electrodes on the first dielectric substrate overlap with each other, and orthographic projections of a long side of the second end and a short side of the other reference sub-electrode on the first dielectric substrate overlap with each other.

In some embodiments, when the branch structures are connected to the main structure on the first side of the main structure, an end surface of each branch structure away from the main structure is flush with an end surface of each reference sub-electrode of the first reference electrode away from the main structure: when the branch structures are connected to the main structure on the second side of the main structure, an end surface of each branch structure away from the main structure is flush with an end surface of each reference sub-electrode of the second reference electrode away from the main structure.

In some embodiments, when the first reference electrode includes the plurality of reference sub-electrodes, widths of the first gaps are the same, and/or lengths of the plurality of reference sub-electrodes are the same: when the second reference electrode includes the plurality of reference sub-electrodes, widths of the first gaps are the same, and/or lengths of the plurality of reference sub-electrodes are the same.

In some embodiments, the first reference electrode and the second reference electrode each include the plurality of reference sub-electrodes, and the first reference electrode and the second reference electrode are arranged in mirror symmetry with respect to the main structure as a symmetry axis.

In some embodiments, the first reference electrode and the second reference electrode each include the plurality of reference sub-electrodes, and first gaps in the first reference electrode and in the second reference electrode are arranged in a staggering manner.

In some embodiments, one of the branch structures is connected to a first bias signal line, and one of the plurality of reference sub-electrodes is connected to a second bias signal line.

In some embodiments, the first bias signal line is connected to an end of the branch structure away from the main structure; and the second bias signal line is connected to one side of the reference sub-electrode away from the main structure.

In some embodiments, the first bias signal line, the second bias signal line, and the signal electrode are in a same layer and are made of the same material.

In some embodiments, an overlapping region of orthographic projections of each membrane bridge and the corresponding branch structure is a first region: at least a part of the first regions have different areas.

In some embodiments, at least a part of the bridge floors the plurality of membrane bridges have different widths.

In some embodiments, at least a part of the branch structures have different widths.

In a second aspect, an embodiment of the present disclosure provides an electronic device, which includes the radio frequency device.

DETAIL DESCRIPTION OF THE EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. Further, the term “a”, “an”, “the”, or the like used herein does not denote a limitation of quantity, but rather denotes the presence of at least one element. The term of “comprising”, “including”, or the like, means that the element or item preceding the term contains the element or item listed after the term and its equivalent, but does not exclude other elements or items. The term “connected”, “coupled”, or the like is not limited to physical or mechanical connections, but may include electrical connections, whether direct or indirect connections. The terms “upper”, “lower”, “left”, “right”, and the like are used only for indicating relative positional relationships, and when the absolute position of an object being described is changed, the relative positional relationships may also be changed accordingly.

Figure 1:
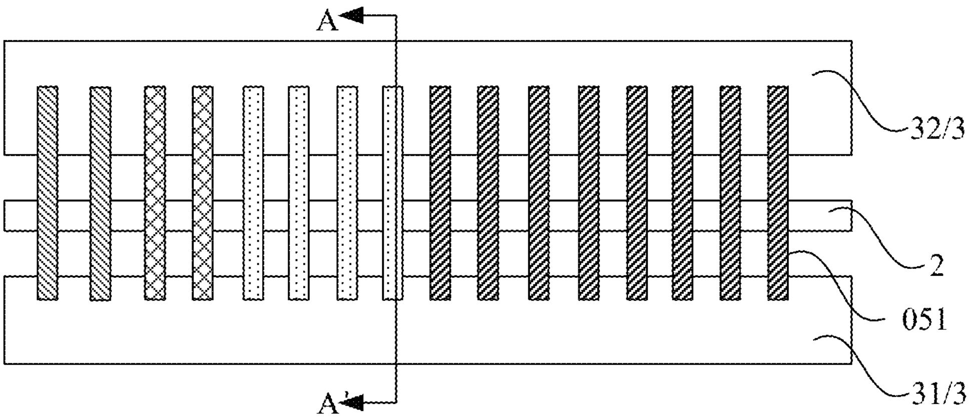
FIG. 1 (PRIOR ART)
FIG. 1 shows a structure of an exemplary phase shifter.
Figure 2:
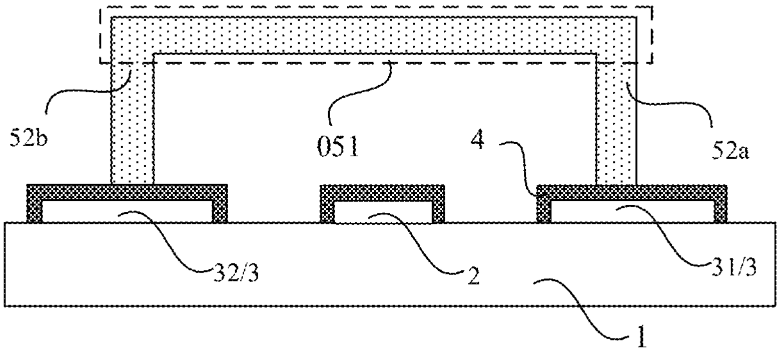
FIG. 2 (PRIOR ART)
FIG. 2 is a cross-sectional view taken along a line A-A' of FIG. 1.

FIG. 1 shows a structure of an exemplary phase shifter. FIG. 2 is a cross-sectional view taken along a line A-A' of FIG. 1. As shown in FIGS. 1 and 2, the phase shifter includes a first dielectric substrate 1 (not shown in FIG. 1 and as shown in FIG. 2), a signal electrode 2, a reference electrode 3, a first insulating layer 4 (FIG. 2), and a plurality of membrane bridges 051.

Specifically, the signal electrode 2 is disposed on the first dielectric substrate, the reference electrode 3 is disposed on the first dielectric substrate and on at least one side of the signal electrode 2. In the embodiment, as an example, the reference electrode 3 includes a first reference electrode 31 and a second reference electrode 32 disposed on two sides of the signal electrode 2 for description. The signal electrode 2 and the reference electrode 3 are arranged in the same layer, a first insulating layer is arranged on a side of the signal electrode 2 and the reference electrode 3 away from the first dielectric substrate, and the first insulating layer covers the signal electrode 2 and the reference electrode 3.

The membrane bridges 051 are arranged on a side of the first insulating layer away from the first dielectric substrate, and each membrane bridge 051 is bridged between the first reference electrode 31 and the second reference electrode 32. That is, each membrane bridges 051 includes a support part 52*a*, 52*b* (FIG. 2) and a bridge floor part (a bridge floor for short), one end of the support part is connected to the bridge floor part, the other end of the support part is fixed on the first insulating layer which covers the reference electrode 3 (the first reference electrode 31 or the second reference electrode 32) so as to suspend the bridge floor of the membrane bridge 051 on the signal electrode 2. That is, the bridge floor of the membrane bridge 051 and the signal electrode 2 have a certain distance therebetween, and an orthographic projection of the membrane bridge 051 on the first dielectric substrate at least partially overlaps with an orthographic projection of the signal electrode 2 on the first dielectric substrate, so that if direct current bias voltages are input to the membrane bridge 051 and the signal electrode 2, the membrane bridge 051 may form a capacitor with the signal electrode 2. The bridge floor part of the membrane bridge 051 has certain elasticity, and the direct current bias voltage is input into the membrane bridge 051 and may drive the bridge floor part of the membrane bridge 051 to move in a direction perpendicular to the signal electrode 2. That is, the direct current bias voltage is input into the membrane bridge 051 and may change the distance between the bridge floor of the membrane bridge 051 and the signal electrode 2, so that a capacitance of the capacitor formed by the bridge floor of the membrane bridge 051 and the signal electrode 2 may be changed, and the phase shift for the microwave signal is realized.

The inventors found that since the membrane bridges in the phase shifter are disposed on the first reference electrode and the second reference electrode, the span of the membrane bridges may be limited by sizes of the first reference electrode and the second reference electrode. In addition, a first bias signal line for loading a signal to the signal electrode in the phase shifter is generally arranged on a side of the reference electrode and the signal electrode close to a first dielectric substrate, an insulating layer is arranged between the first bias signal line and the reference electrode to isolate the first bias signal line from the reference electrode, the first bias signal line is electrically connected to the signal electrode, and a certain insertion loss is inevitably introduced due to the existence of the insulating layer.

In order to solve at least one of the above technical problems, an embodiment of the present disclosure provides a radio frequency device, where the radio frequency device may be a phase shifter. In an embodiment of the present disclosure, as an example, the radio frequency device is a phase shifter.

In a first aspect, an embodiment of the present disclosure provides a phase shifter, including a first dielectric substrate, and at least one phase shift unit disposed on the first dielectric substrate: each phase shift unit includes a signal electrode, a first reference electrode, a second reference electrode, a first insulating layer, and at least one membrane bridge disposed on the first dielectric substrate.

Figure 3:
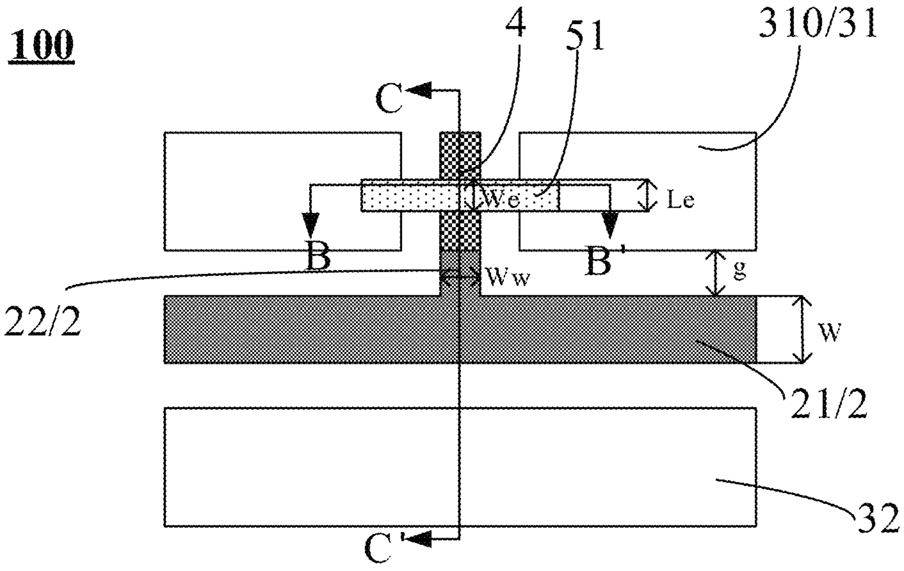
FIG. 3 is a schematic diagram of a structure of a phase shift unit in a first example in the embodiment of the present disclosure.
Figure 15:
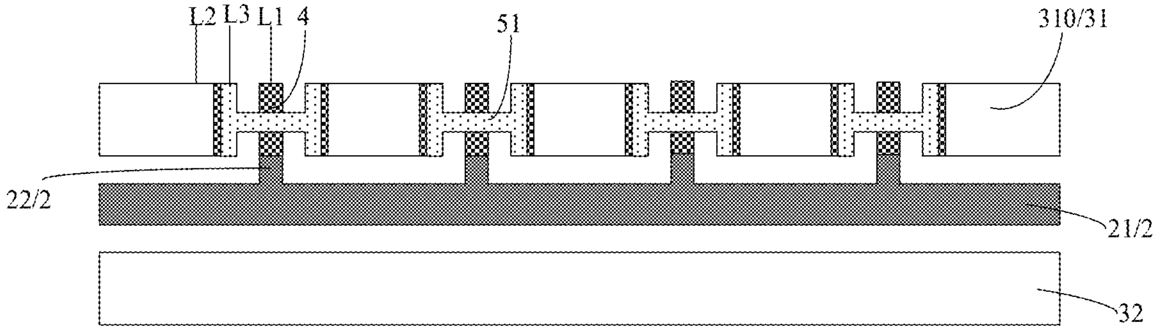
FIG. 15 is a schematic diagram of a phase shifter employing a phase shift unit shown in FIG. 14.
Figure 17:
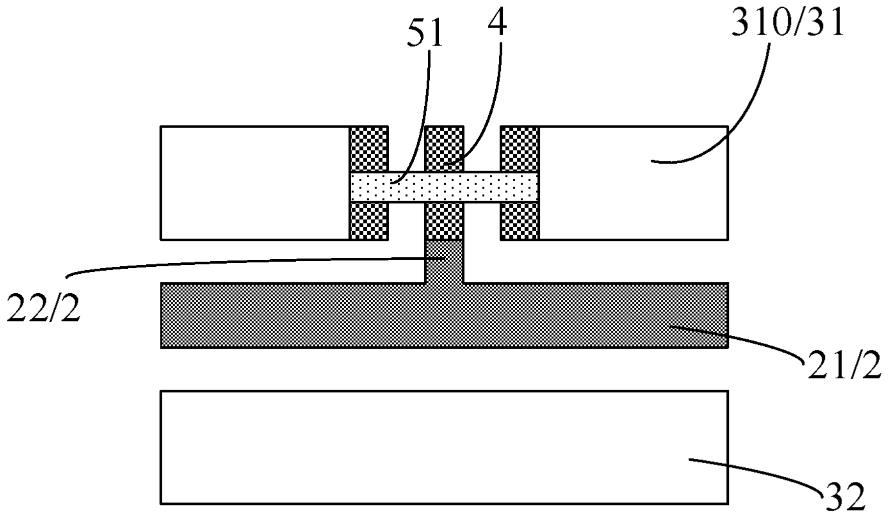
FIG. 17 is a schematic diagram of a structure of a phase shift unit in a third example in the embodiment of the present disclosure.

At least one of the first reference electrode and the second reference electrode includes a plurality of reference sub-electrodes arranged side by side along extending directions of the plurality of reference sub-electrodes, and first gaps between every two adjacent reference sub-electrodes. As shown in FIGS. 3, 15 and 17, the signal electrode 2 includes a main structure 21 and branch structures 22 electrically connected to the main structure 21, the main structure is located between the first reference electrode 31 and the second reference electrode 32, and each branch structure extends into one corresponding first gap. For example, when the first reference electrode includes a plurality of reference sub-electrodes 310, the branch structures are connected to a side of the main structure (a first side of the main structure) close to the first reference electrode, and the branch structures are in one-to-one correspondence with the first gaps and each branch structure extends into one corresponding first gap: similarly, when the second reference electrode includes a plurality of reference sub-electrodes, the branch structures are connected to a side of the main structure (a second side of the main structure) close to the second reference electrode, and the branch structures are in one-to-one correspondence with the first gaps and each branch structure extends into one corresponding first gap.

The first insulating layer at least covers the branch structures, the membrane bridges are arranged on a side of the first insulating layer away from the first dielectric substrate, each membrane bridge spans one corresponding first gap, and the bridge floor of each membrane bridge and the first insulating layer have a first distance therebetween in a direction perpendicular to the first dielectric substrate. In this case, different direct current bias voltages are loaded on the branch structure and the membrane bridge corresponding to each other, the formed electrostatic force may drive the membrane bridge to move towards the branch structure, so that the distance between the membrane bridge and the branch structure is adjusted, a capacitance value formed between the membrane bridge and the branch structure is changed, thereby achieving the phase shifting.

In the embodiment of the present disclosure, at least one of the first reference electrode and the second reference electrode is divided into a plurality of reference sub-electrodes, the signal electrode is designed into a structure in which the branch structures are electrically connected to the main structure, the coplanar waveguide is formed by the branch structures and the reference sub-electrodes, and the membrane bridges are arranged at positions corresponding to the branch structures, so that different phase shift degrees can be realized by changing a width of each branch structure, a width of the bridge floor of each membrane bridge and a thickness of the first insulating layer. The influence of the span of the bridge floor of the membrane bridge having such the structure on the phase shift degrees is not large, so that the membrane bridge with any span may be selected according to an actual process and a required voltage.

In the embodiments of the present disclosure, the number of the phase shift units may be one or more. In the embodiment of the present disclosure, the number of the phase shift units is multiple, which is not intended to limit the scope of the embodiments of the present disclosure.

The phase shift units in the embodiments of the present disclosure are specifically described below with reference to specific examples.

Figure 4:
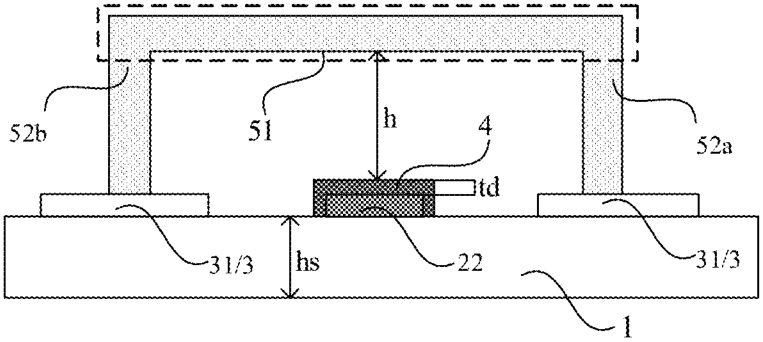
FIG. 4 is a cross-sectional view taken along a line B-B' of FIG. 3.
Figure 5:
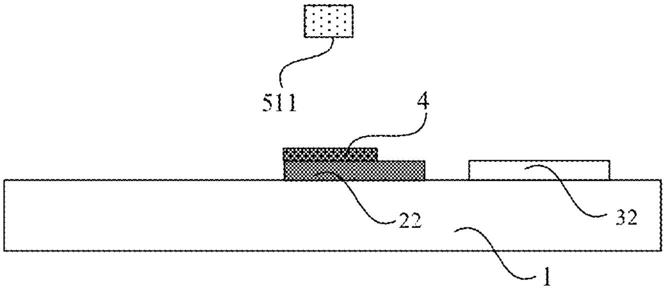
FIG. 5 is a cross-sectional view taken along a line C-C' of FIG. 3.

In a first example, in the embodiment of the present disclosure, the branch structures are connected to only one side of the main structure of the signal electrode, and only one of the first reference electrode and the second reference electrode includes the reference sub-electrodes which are spaced from each other and arranged side by side. FIG. 3 is a schematic diagram of a structure of a phase shift unit 100 in a first example in the embodiment of the present disclosure. FIG. 4 is a cross-sectional view taken along a line B-B' of FIG. 3. FIG. 5 is a cross-sectional view taken along a line C-C' of FIG. 3. As shown in FIGS. 3 to 5, the first reference electrode 31 (FIGS. 3 and 4) includes two reference sub-electrodes 310 (FIG. 3) as an example. The branch structure 22 extends into the first gap, the first insulating layer 4 only covers the branch structure 22, and the first insulating layer 4 is not disposed on the reference sub-electrodes 310, that is, the reference sub-electrodes 310 are electrically connected to the membrane bridge, and a same voltage is applied to the reference sub-electrodes 310 and the membrane bridge in operation. At this time, different direct current bias voltages may be applied to the reference sub-electrodes 310 and the branch structure 22, and at this time, the bridge floor of the membrane bridge is pulled towards the surface of the first insulating layer 4 under the action of electrostatic force, so that the capacitance between the bridge floor 51 (FIGS. 3 and 4) of the membrane bridge and the branch structure 22 is changed, thereby achieving the phase shifting.

Figure 6:
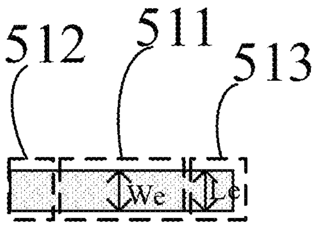
FIG. 6 is a top view of a bridge floor of a membrane bridge in a phase shift unit shown in FIG. 3.
Figure 7:
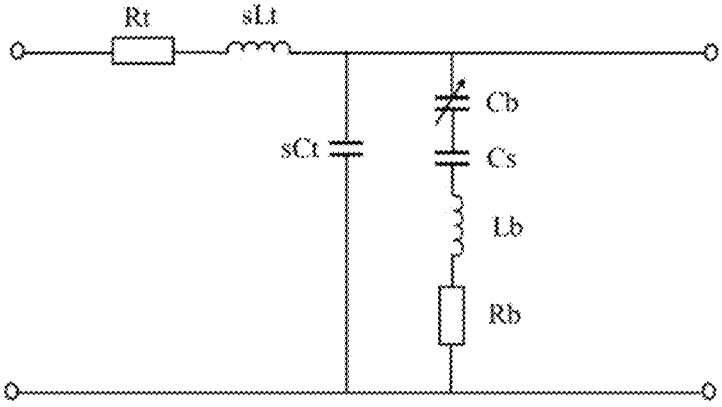
FIG. 7 is an equivalent circuit diagram of a phase shift unit shown in FIG. 3.

As shown in FIG. 4, the membrane bridge includes a bridge floor 51 and two support parts 52*a* and 52*b*. FIG. 6 is a top view of a bridge floor of a membrane bridge; as shown in FIG. 6, the bridge floor 51 of the membrane bridge includes a first end 512, a second end 513, and a connection portion 511 connected between the first end 512 and the second end 513. The first end 512 and the second end 513 are respectively connected to the two support parts, an orthographic projection of the first end 512 on the first dielectric substrate is completely located within one reference sub-electrode 310, an orthographic projection of the second end 513 on the first dielectric substrate is completely located within the other reference sub-electrode 310, and an orthographic projection of the connection portion 511 on the first dielectric substrate is located in the first gap. Length directions of the first and second ends 512 and 513 are the same as a width direction of the reference sub-electrode 310, and a width direction of the connection portion 511 is the same as the width direction of the reference sub-electrode 310. Capacitors formed between the first end 512 and the second end 513 and the corresponding reference sub-electrodes 310 have fixed capacitances Cs (FIG. 7), and a capacitor formed between the connection portion 511 and the branch structure 22 has a variable capacitance Cb (FIG. 7). FIG. 7 is an equivalent circuit diagram of a phase shift unit 100 shown in FIG. 3. As shown in FIG. 7, where Rt is an equivalent resistance of the first reference electrode 31, the second reference electrode 32, and the signal electrode 2, Lt and Ct are an equivalent inductance and an equivalent capacitance per unit length of the first reference electrode 31, the second reference electrode 32, and the signal electrode 2, respectively, s is a length of a single phase shift unit 100, and Lb and Rb are an equivalent inductance and an equivalent resistance of the membrane bridge, respectively. A height h (FIG. 4) of the membrane bridge is changed, so that the capacitance Cb is change, and then the transmission constant of the transmission structure is changed, thereby achieving the phase shifting.

In some examples, the first dielectric substrate may be made of glass, a hard base material such as glass reinforced epoxy FR4, or a flexible material such as polyethylene terephthalate PET or Polyimide PI. In the embodiment of the present disclosure, as an example, the first dielectric substrate is made of single-layer glass, which has a dielectric constant of 5.2 and a loss tangent of 0.0106. Materials of the first reference electrode 31, the second reference electrode 32 and the signal electrode 2 may be metal, such as copper, aluminum, or molybdenum/aluminum/molybdenum, or the like. In the embodiment of the present disclosure, as an example, the materials of the first reference electrode 31, the second reference electrode 32 and the signal electrode 2 are copper. A material of the first insulating layer 4 may be selected from commonly used insulating materials, such as silicon nitride, silicon oxide, or the like. In the embodiment of the present disclosure, as an example, the material of the first insulating layer 4 is silicon nitride, which has a dielectric constant of 7. A material of the membrane bridge may be metal, such as: copper, aluminum, or molybdenum/aluminum/molybdenum or the like. In the embodiment of the present disclosure, as an example, the materials of the membrane bridge is aluminum.

Figure 8:
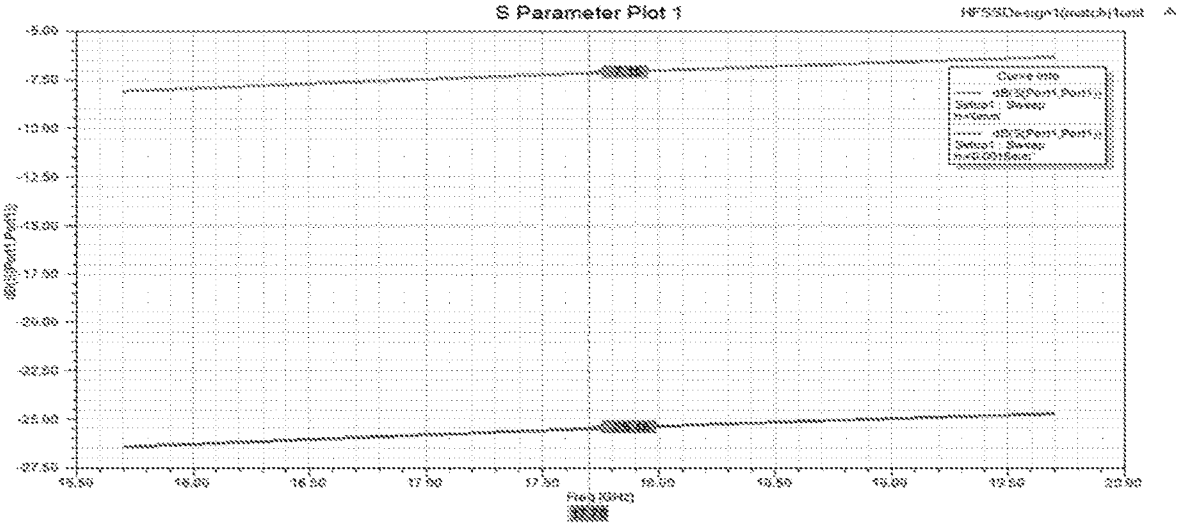
FIG. 8 is a simulation curve of S11 of a phase shift unit shown in FIG. 3.
Figure 9:
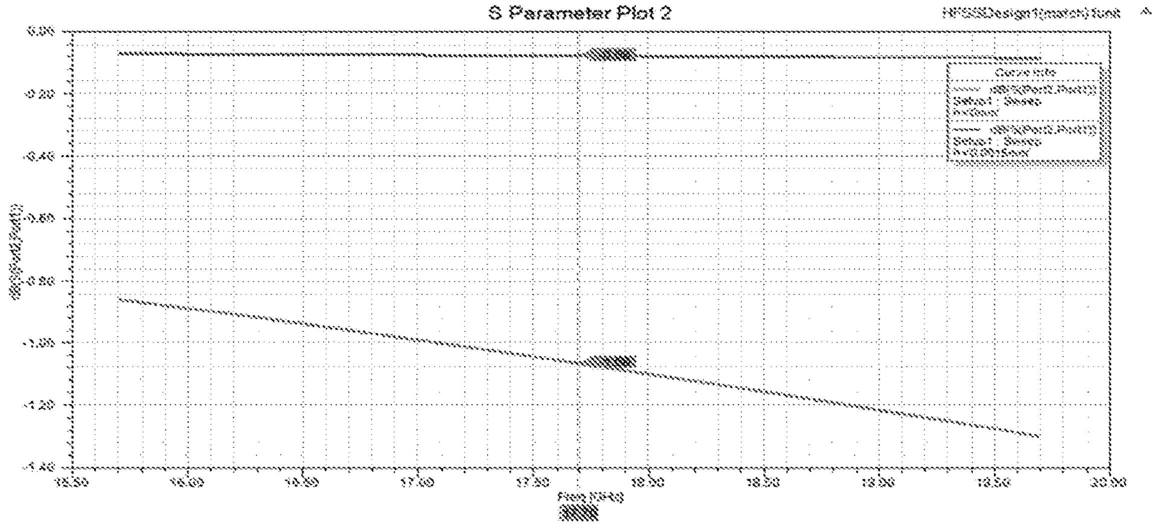
FIG. 9 is a simulation curve of S21 of a phase shift unit shown in FIG. 3.
Figure 10:
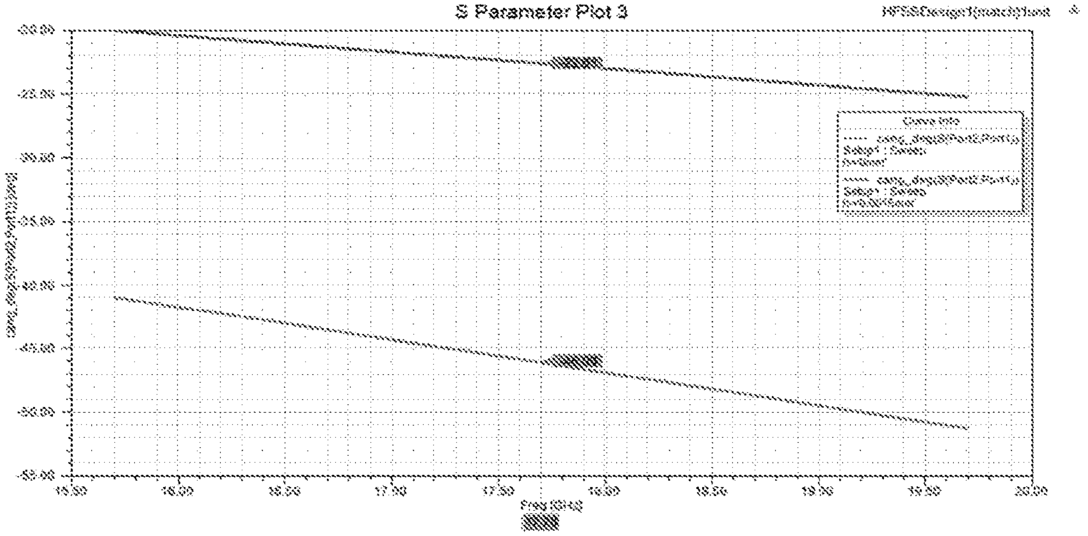
FIG. 10 is a phase simulation curve of S21 of a phase shift unit shown in FIG. 3.

In order to make the effect of the phase shifter in the embodiments of the present disclosure clearer, the following simulation experiment is performed for description by referring to FIGS. 3-4 and 6. By taking a frequency of 17.7 GHZ as an example, a length of the phase shift unit 100 is 0.5 mm, a width W (FIG. 3) of the main structure 21 of the signal electrode 2 is 0.02 mm, a width of the reference sub-electrode 310 is 0.1 mm, a gap g (FIG. 3) between the main structure 21 and the reference sub-electrode 310 (the first reference electrode 31/the second reference electrode 32) is 0.034 mm, a width Ww (FIG. 3) of the branch structure 22 is 0.02 mm, a width of the first gap is 0.06 mm, a width We (FIGS. 3 and 6) of the bridge floor of the membrane bridge is 0.02 mm, a height h (FIG. 4) of the membrane bridge is 0.0015 mm, a length Le (FIGS. 3 and 6) of the first end 512 of the membrane bridge (the second end 513 of the membrane bridge) is 0.02 mm, and a thickness td (FIG. 4) of the first insulating layer 4 is 0.0003 mm, a thickness hs (FIG. 4) of the first dielectric substrate is 0.5 mm. FIG. 8 is a simulation curve of S11 of a phase shift unit 100 shown in FIG. 3. FIG. 9 is a simulation curve of S21 of a phase shift unit 100 shown in FIG. 3. FIG. 10 is a phase simulation curve of S21 of a phase shift unit 100 shown in FIG. 3. Particularly, FIGS. 8 and 9 show amplitudes of return loss S11 and insertion loss S21 with frequency f, respectively: FIG. 10 shows phases Cang_deg S21 with frequency f for insertion loss S21. In FIGS. 8 to 10, the X-axis represents frequency in GHz, and the Y-axis represents the phase shift degree. As shown in FIGS. 8 to 10, when the frequency is 17.7 GHZ, each phase shift unit 100 may shift the phase by 23.48° at maximum, when the membrane bridge is not pulled down, the return loss S11 is −25.46 dB, and the insertion loss S21 is −0.08 dB.

When the width Ww of the branch structure 22 is changed from 0.01 mm to 0.03 mm, the phase shift degree of the single phase shift unit 100 may be changed from 12.39° to 33.14°. When the width We of the bridge floor 51 of the membrane bridge is changed from 0.01 mm to 0.03 mm, the phase shift degree of the single phase shift unit 100 may be changed from 13.08° to 33.21°. When the span (i.e., a slot width Ws) of the membrane bridge is changed from 0.04 mm to 0.08 mm, the phase shift degree of the single phase shift unit 100 may be substantially unchanged. In addition, by reducing the thickness td of the first insulating layer 4, the phase shift degree of the single phase shift unit 100 may be also increased. Based on the above relationship among changes of the width Ww of the branch structure, the width We of the bridge floor 51 of the membrane bridge, the thickness td of the first insulting layer 4, it can be concluded that different phase shift degrees can be achieved by changing the width Ww of the branch structure 22, the width We of the bridge floor 51 of the membrane bridge and the thickness td of the first insulating layer 4, but that the span Ws of the membrane bridge has little influence on the phase shift degree.

Figure 11:
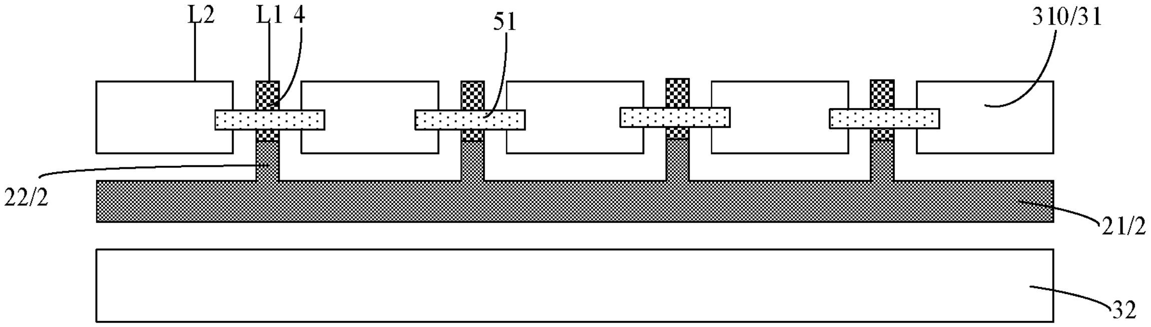
FIG. 11 is a schematic diagram of a phase shifter employing a phase shift unit shown in FIG. 3.

Accordingly, FIG. 11 is a schematic diagram of a phase shifter employing a phase shift unit 100 shown in FIG. 3. As shown in FIG. 11, the phase shifter includes a plurality of phase shift units 100 connected in cascade (series). In the phase shifter structure, the reference sub-electrodes of two adjacent phase shift units 100 have a one-piece structure.

By cascading the phase shift units 100, a greater phase shift degree can be achieved. With the phase shift unit 100 shown in FIG. 4, a continuous analog phase shift can be realized. FIG. 11 is a schematic diagram of four cascading phase shift units 100, and only different direct current bias voltages need to be applied to each branch structure 22 and the corresponding reference sub-electrode 310 to form a voltage difference therebetween, so that the membrane bridge will be correspondingly pulled down by a certain height, thereby realizing a certain phase shift degree. When the phase shift units 100 are cascaded, attention needs to be paid to selecting a proper unit length (the length of the phase shift unit), and when the distance between two adjacent units is small, coupling exists between the two different units, so that the overall phase shift degree is reduced. For a frequency of 17.7 GHZ, Lg=0.8 mm is a proper unit length, each phase shift unit 100 may have a phase shift of 25°, different phase shift degrees can be realized by cascading different numbers of phase shift units 100, four phase shift units 100 may shift the phase by 101°, eight phase shift units 100 may shift the phase by 201°, sixteen phase shift unit 100 may shift the phase by 397°: when the membrane bridge is not pulled down, as for the sixteen phase shift units 100, the return loss S11 is −20.32 dB, and the insertion loss S21 is −1.65 dB.

Further, the width of the branch structure 22 in each phase shift unit 100 is constant, a width of the first gap in each phase shift unit 100 is constant, and a width of the bridge floor 51 of the membrane bridge in each phase shifter is constant. Alternatively, a thickness of the first insulating layer 4 in each phase shift unit 100 may be constant, the phase shift unit 100 having this structure is easy to be manufactured.

Further, referring to FIG. 11, an end surface of each branch structure 22 away from the main structure 21 is flush with a side surface of each reference sub-electrode 310 away from the main structure 21, one end of one branch structure 22 away from the main structure 21 is connected to a first bias signal line L1, and one reference sub-electrode 310 is connected to a second bias signal line L2. Direct current bias voltages are applied to the branch structure 22 and the reference sub-electrode 310 via the first bias signal line L1 and the second bias signal line L2, respectively. In this way, the insertion loss introduced by the first bias signal line L1 can be avoided.

Figure 12:
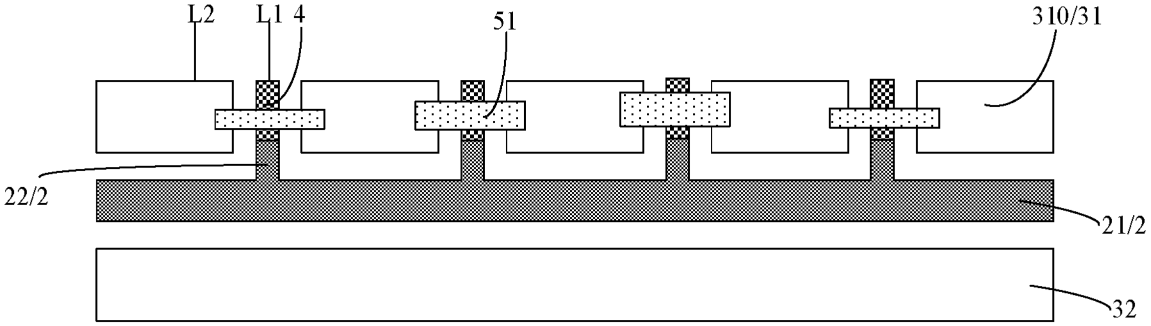
FIG. 12 is a schematic diagram of another phase shifter employing a phase shift unit shown in FIG. 3.
Figure 13:
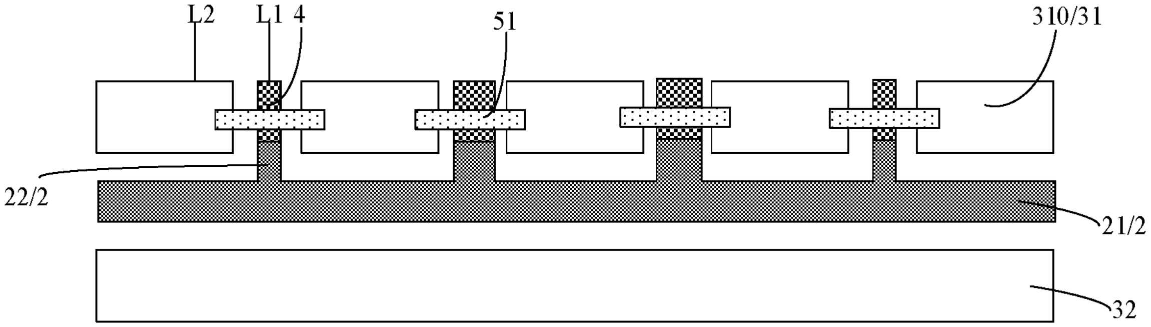
FIG. 13 is a schematic diagram of still another phase shifter employing a phase shift unit shown in FIG. 3.

FIG. 12 is a schematic diagram of another phase shifter employing a phase shift unit 100 shown in FIG. 3. FIG. 13 is a schematic diagram of still another phase shifter employing a phase shift unit 100 shown in FIG. 3. As shown in FIGS. 12 and 13, an overlapping region of the branch structure and the membrane bridge in each unit is a first region, and for the entire phase shifter, areas of at least a part of the first regions are different from each other. In FIG. 13, the widths of at least a part of the branch structures 22 are different from each other, so that the areas of at least a part of the first regions are different from each other. In FIG. 12, the widths of at least a part of the bridge floors 51 of the membrane bridges are different from each other, so that the areas of at least a part of the first regions are different from each other. In some examples, no matter which manner as shown in FIG. 12 or FIG. 13 is used so that the areas of at least a part of the first regions are different from each other, an area of the first region in the middle portion of the phase shifter may be designed to be not smaller than that of each first region in the periphery of the phase shifter. In this way, the influence of the uniformity can be reduced.

Figure 14:
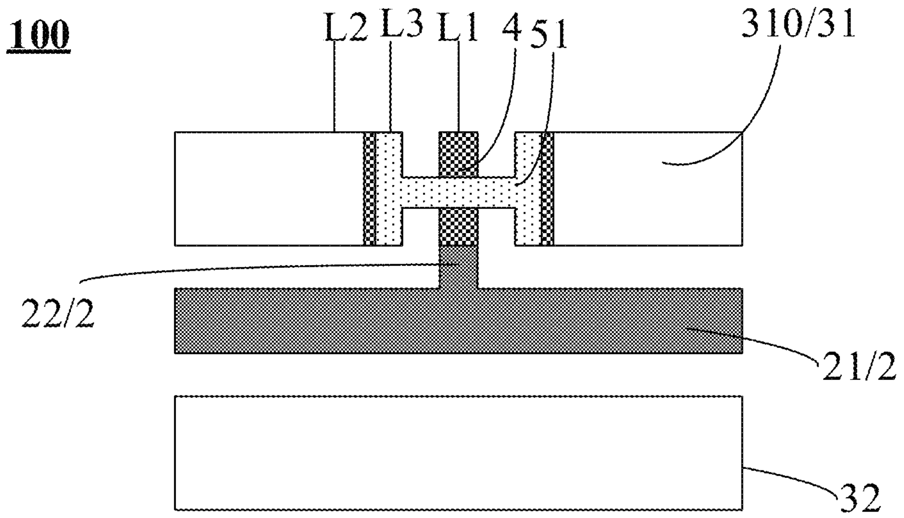
FIG. 14 is a schematic diagram of a structure of a phase shift unit in a second example in the embodiment of the present disclosure.

In a second example, FIG. 14 is a schematic diagram of a structure of a phase shift unit 100 in a second example in the embodiment of the present disclosure. FIG. 15 is a schematic diagram of a phase shifter employing a phase shift unit 100 shown in FIG. 14. As shown in FIGS. 14 and 15, the phase shift unit 100 is substantially identical in structure to the phase shift unit 100 in the first example, except that in this example, the first insulating layer 4 covers not only the branch structures 22 but also the reference sub-electrodes 310, that is, the first insulating layer 4 is provided between the support portion of the membrane bridge and the reference sub-electrode 310. In this case, each membrane bridge may be applied with a control voltage through the individual control signal line L3, thereby achieving an independent control of each membrane bridge and thus achieving a digital phase shifter having more bits.

Figure 16:
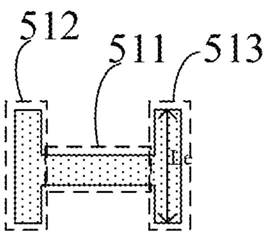
FIG. 16 is a schematic diagram of a bridge floor of a membrane bridge in a phase shift unit shown in FIG. 14.

Further, FIG. 16 is a schematic diagram of a bridge floor of a membrane bridge in a phase shift unit shown in FIG. 14. As shown in FIG. 16, the lengths Le of the first end 512 and the second end 513 of the bridge floor 51 (FIG. 15) of each membrane bridge are different from the width of the connection portion 511, and orthographic projections of the first end 512 and the second end 513 on the first dielectric substrate are respectively located within orthographic projections of the corresponding two reference sub-electrodes 310 (FIG. 15) on the first dielectric substrate, and orthographic projections of a long side of the first end 512 and a short side of one of the two reference sub-electrodes 310 on the first dielectric substrate overlap with each other, and orthographic projections of a long side of the second end 513 and a short side of the other reference sub-electrode 310 on the first dielectric substrate overlap with each other. In this case, the control signal line L3 is connected to the end of the membrane bridge away from the main structure 21.

Taking the phase shift unit 100 having the same size as in the first example as an example, a thickness of the first insulating layer 4 between the membrane bridge and the reference sub-electrode 310 is 0.03 mm, and the lengths Le of the first end 512 and the second end 513 of the membrane bridge are both 0.01 mm, and the simulation result shows that each phase shift unit 100 may shift the phase by 22.47°, when the membrane bridge is not pulled down, the return loss S11 is −11.84 dB, and the insertion loss S21 is −0.52 dB. When cascading, the parameters of the phase shift units 100 are not necessarily the same, and different parameters may be selected to realize different functions of the phase shifter.

The remaining structures in the phase shifter may adopt the same structures as in the first example, and thus, the description thereof is not repeated.

Figure 18:
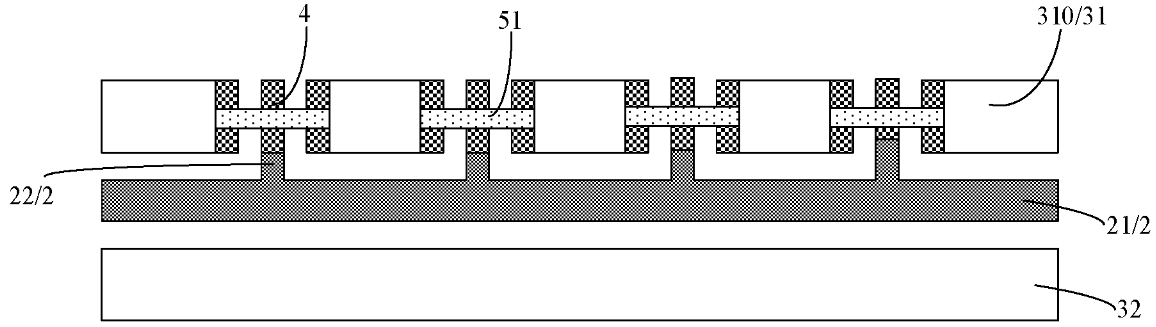
FIG. 18 is a schematic diagram of a phase shifter employing a phase shift unit shown in FIG. 17.

In a third example, FIG. 17 is a schematic diagram of a structure of a phase shift unit 100 in a third example in the embodiment of the present disclosure. FIG. 18 is a schematic diagram of a phase shifter employing a phase shift unit 100 shown in FIG. 17. As shown in FIGS. 17 and 18, the structure of the phase shift unit 100 in this example is substantially the same as that in the second example, except that the lengths Le of the first and second ends 512 and 513 of the membrane bridge are not equal to the width of the reference sub-electrode 310, but are equal to the width of the connection portion 511 of the membrane bridge. At this time, the control signal line L3 is electrically connected to the membrane bridge through the first insulating layer 4 on the reference sub-electrode 310. The phase shifter with the structure can also realize the independent control of each phase shift unit 100, and the simulation result shows that each phase shift unit 100 may shift the phase by 16.65°, the return loss S11 is −25.67 dB, and the insertion loss S21 is −0.1 dB when the bridge is not pulled down. As may be seen from comparison with the second example, when the first insulating layer 4 is provided between the membrane bridge and the reference sub-electrode 310, by changing the lengths Le of the first end 512 and the second end 513 of the bridge floor 51 of the membrane bridge, the phase shift degree can be adjusted, mainly due to the capacitance change caused by the change in the overlapping areas of the first end 512 and the second end 513 of the bridge floor with the reference sub-electrodes 310: similarly, the widths of the first end 512 and the second end 513 are changed, which can achieve a similar effect.

Figure 19:
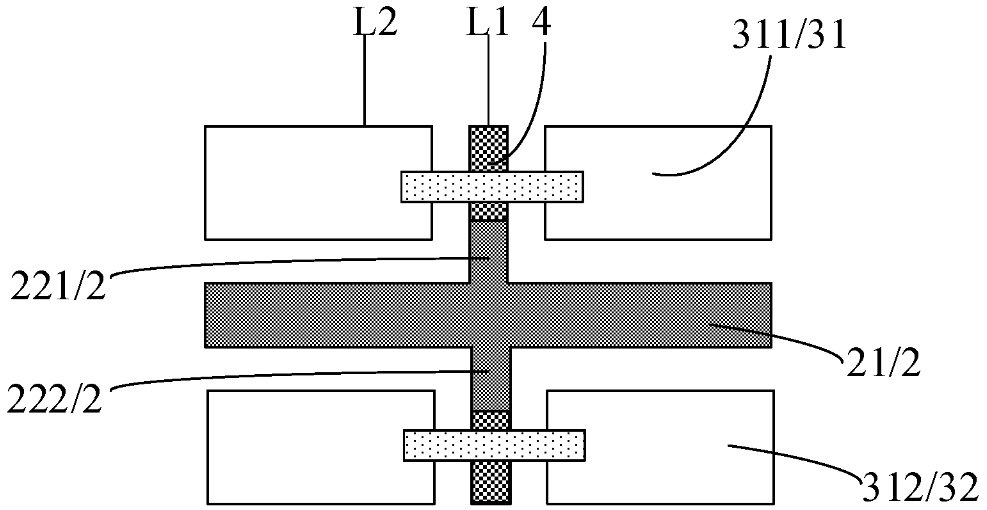
FIG. 19 is a schematic diagram of a structure of a phase shift unit in a fourth example of the embodiment of the present disclosure.
Figure 20:
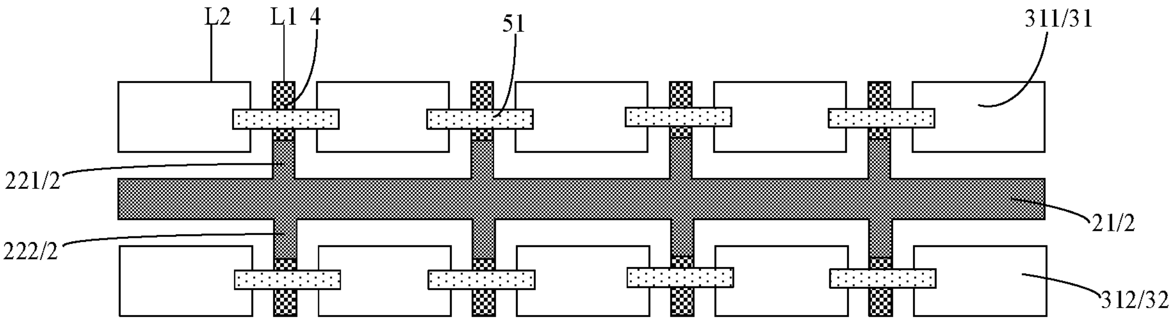
FIG. 20 is a schematic diagram of a phase shifter employing a phase shift unit shown in FIG. 19.

In a fourth example, FIG. 19 is a schematic diagram of a structure of a phase shift unit 100 in a fourth example of the embodiment of the present disclosure. FIG. 20 is a schematic diagram of a phase shifter employing a phase shift unit 100 shown in FIG. 19. As shown in FIGS. 19 and 20, the phase shift unit 100 in this example differs from that in the first example, in that not only the first reference electrode 31 includes a plurality of reference sub-electrodes 310, but also the second reference electrode 32 includes a plurality of reference sub-electrodes 310, and the signal electrode 2 includes not only the branch structures 22 connected to the first side of the main structure 21 but also the branch structures 22 connected to the second side of the main structure 21. For ease of understanding, the branch structure 22 connected to the first side of the main structure 21 is referred to as a first branch structure 221, the branch structure 22 connected to the second side of the main structure 21 is referred to as a second branch structure 222, the reference sub-electrode 310 included in the first reference electrode 31 is referred to as a first reference sub-electrode 311, and the reference sub-electrode 310 included in the second reference electrode 32 is referred to as a second reference sub-electrode 312. Each first branch structure 221 extends into the first gap between the corresponding two first reference sub-electrodes 311; and each second branch structure 222 extends into the first gap between the two corresponding second reference sub-electrodes 312.

In this case, each phase shift unit 100 includes two membrane bridges, two first reference sub-electrodes 311, two second reference sub-electrodes 312, the main structure 21 between the first reference electrode 31 and the second reference electrode 32, and one first branch structure 221 and one second branch structure 222 connected to the main structure 21.

Further, with reference to FIG. 19, the first branch structure 221 and the second branch structure 222 are arranged in mirror symmetry with respect to the main structure 21 as a symmetry axis. Similarly, the first reference electrode 31 composed of the plurality of first reference sub-electrodes 311 and the second reference electrode 32 composed of the plurality of second reference sub-electrodes 312 are arranged in mirror symmetry with respect to the main structure 21 as a symmetry axis. In this case, the single phase shift unit 100 may shift the phase by 38.56°. The return loss S11 is −20.12 dB and the insertion loss is −0.12 dB when the membrane bridge is not pulled down. As may be seen from comparison with the first example, the phase shifter could almost double the phase shift degree without increasing the length of the phase shift unit 100. For all the cascaded phase shift units 100, the same voltage may be applied to the first reference sub-electrodes 311 and the second reference sub-electrodes, and the same voltage may be applied to the branch structures 22 of the signal electrode 2, so as to realize the uniform control of all the phase shift units 100. Alternatively, if the first insulating layer 4 is disposed between the membrane bridge and the first and second reference sub-electrodes 311 and 312, an independent control of each phase shift unit 100 can be achieved.

Figure 21:
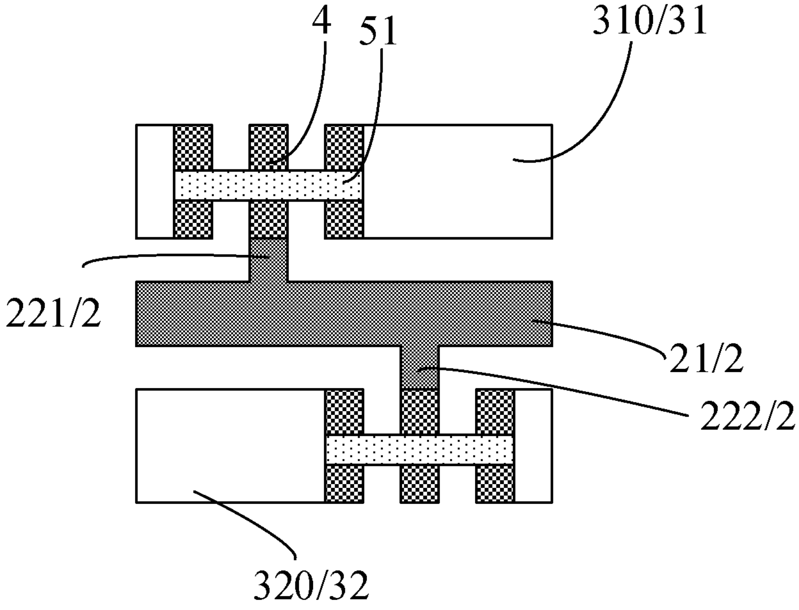
FIG. 21 is a schematic diagram of a structure of a phase shift unit in a fifth example of the embodiment of the present disclosure.
Figure 22:
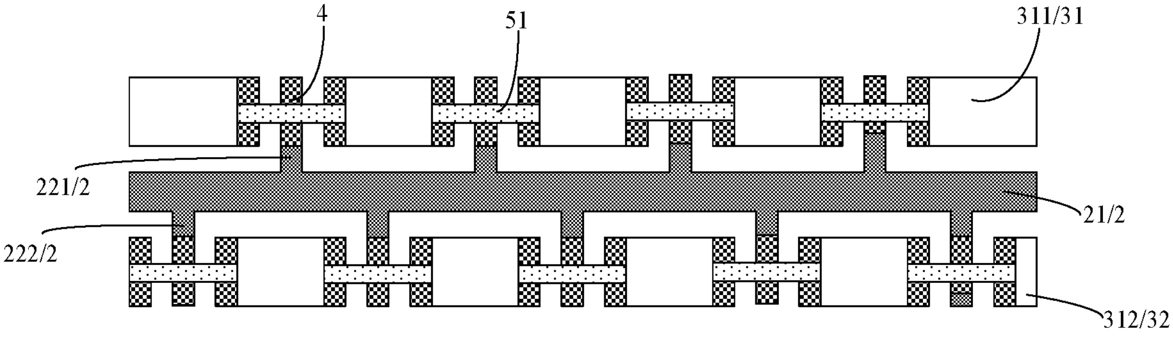
FIG. 22 is a schematic diagram of a phase shifter employing a phase shift unit shown in FIG. 21.

In a fifth example, FIG. 21 is a schematic diagram of a structure of a phase shift unit 100 in a fifth example of the embodiment of the present disclosure. FIG. 22 is a schematic diagram of a phase shifter employing the phase shift unit 100 shown in FIG. 21. As shown in FIGS. 21 and 22, the difference between the fifth example and the fourth example is that the first branch structures 221 and the second sub-branch structures 22 in each phase shift unit 100 are arranged in a staggering manner; and correspondingly, the first gaps between the first reference sub-electrodes 311 and between the second reference sub-electrodes 312 are arranged in a staggering manner, and the remaining structures in the fifth example are the same as those in the fourth example. The simulation result shows that a single phase shift unit 100 may shift the phase by 37.6°, the return loss S11 is −20.04 dB, and the insertion loss is −0.12 dB when the membrane bridge is not pulled down. Similarly, if the first insulating layer 4 is disposed between the membrane bridge and the first and second reference sub-electrodes 311 and 312, an independent control of each phase shift unit 100 can be achieved.

It should be noted that, for the phase shifter, only a few exemplary structures are given above, and the present disclosure is not limited thereto. For example, only the second reference electrode 32 is configured to include the plurality of reference sub-electrodes 310, and correspondingly, the branch structures 22 are connected to the main structure 21 at the second side of the main structure 21, which is also within the protection scope of the embodiment of the present disclosure. In addition, when the branch structures are disposed on both the first side and the second side of the main structure 21, the number of the branch structures on the first side may be different from the number of the branch structures on the second side. That is, the number of the reference sub-electrodes in the first reference electrode is different from the number of the reference sub-electrodes in the second reference electrode.

In a second aspect, an embodiment of the present disclosure provides an electronic device which includes the antenna, which may include the phase shifter.

In some embodiments, the antenna provided by an embodiment of the present disclosure further includes a transceiver unit, a radio frequency transceiver, a signal amplifier, a power amplifier, and a filtering unit. The antenna may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by the antenna and is processed by the filtering unit, the power amplifier, the signal amplifier and the radio frequency transceiver, the antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the antenna, the signal amplifier is used for improving a signal-to-noise ratio of the signals output by the radio frequency transceiver and then transmitting the signals to the filtering unit: the power amplifier is used for amplifying the power of the signals output by the radio frequency transceiver and then transmitting the signals to the filtering unit: the filtering unit specifically includes a duplexer and a filtering circuit, the filtering unit combines signals output by the signal amplifier and the power amplifier and filters noise waves and then transmits the signals to the antenna, and the antenna radiates the signals. In the process of receiving signals by the antenna, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some embodiments, the signal amplifier may include various types of signal amplifiers, such as a low noise amplifier, without limitation.

In some embodiments, the antenna provided by the embodiments of the present disclosure further includes a power management unit connected to the power amplifier to provide the power amplifier with a voltage for amplifying the signal.

It should be understood that, the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A phase shifter, comprising a first dielectric substrate, and at least one phase shift unit on the first dielectric substrate; wherein each of the at least one phase shift unit comprises a signal electrode, a first reference electrode, and a second reference electrode on the first dielectric substrate;

at least one of the first reference electrode and the second reference electrode comprises a plurality of reference sub-electrodes arranged side by side, and first gaps between every two adjacent reference sub-electrodes; and the signal electrode comprises a main structure and branch structures electrically connected to the main structure, the main structure is between the first reference electrode and the second reference electrode, and each of the branch structures extends into a corresponding one of the first gaps; the phase shifter further comprises a plurality of membrane bridges, and a first insulating layer covering the branch structures, the plurality of membrane bridges are on a side of the first insulating layer away from the first dielectric substrate, each of the plurality of membrane bridges spans a corresponding one of the first gaps, and a respective bridge floor of each membrane bridge and the first insulating layer have a first distance therebetween in a direction perpendicular to the first dielectric substrate.

2. The phase shifter of claim 1, wherein an overlapping region of orthographic projections of each membrane bridge and the corresponding branch structure is a first region; and for the plurality of membrane bridges and the branch structures, at least a part of the first regions have different areas.

3. The phase shifter of claim 2, wherein at least a part of the bridge floors of the plurality of membrane bridges have different widths.

4. The phase shifter of claim 2, wherein at least a part of the branch structures have different widths.

5. The phase shifter of claim 1, wherein the branch structures are connected to the main structure on a first side of the main structure close to the first reference electrode, an end surface of each of the branch structures away from the main structure is flush with an end surface of each of the plurality of reference sub-electrodes of the first reference electrode away from the main structure; or the branch structures are connected to the main structure on a second side of the main structure close to the second reference electrode, an end surface of each of the branch structures away from the main structure is flush with an end surface of each of the plurality of reference sub-electrodes of the second reference electrode away from the main structure.

6. The phase shifter of claim 1, wherein the first reference electrode comprises the plurality of reference sub-electrodes, widths of the first gaps are the same, and/or lengths of the plurality of reference sub-electrodes are the same; or the second reference electrode comprises the plurality of reference sub-electrodes, widths of the first gaps are the same, and/or lengths of the plurality of reference sub-electrodes are the same.

7. The phase shifter of claim 1, wherein respective ones of the plurality of reference sub-electrodes are formed in both of the first reference electrode and the second reference electrode, and the first reference electrode and the second reference electrode are arranged in mirror symmetry with respect to the main structure as a symmetry axis.

8. The phase shifter of claim 1, wherein respective ones of the plurality of reference sub-electrodes are formed in both of the first reference electrode and the second reference electrode, and the first gaps of the first reference electrode are staggered from the first gaps of the second reference electrode.

9. The phase shifter of claim 1, wherein one of the branch structures is connected to a first bias signal line, and one of the plurality of reference sub-electrodes is connected to a second bias signal line.

10. The phase shifter of claim 9, wherein the first bias signal line is connected to an end of the one branch structure away from the main structure; and the second bias signal line is connected to one side of the reference sub-electrode away from the main structure.

11. The phase shifter of claim 9, wherein the first bias signal line, the second bias signal line, and the signal electrode are in a same layer and are made of a same material.

12. The phase shifter of claim 1, wherein an orthographic projection of the first insulating layer on the first dielectric substrate covers a portion where an orthographic projection of each of the plurality of reference sub-electrodes on the first dielectric substrate overlaps with an orthographic projection of the corresponding membrane bridge on the first dielectric substrate.

13. The phase shifter of claim 12, wherein at least a part of the plurality of membrane bridges are connected to different control signal lines.

14. The phase shifter of claim 12, wherein respective ones of the plurality of reference sub-electrodes are formed in both of the first reference electrode and the second reference electrode, and the first reference electrode and the second reference electrode are arranged in mirror symmetry with respect to the main structure as a symmetry axis.

15. The phase shifter of claim 12, wherein respective ones of the plurality of reference sub-electrodes are formed in both of the first reference electrode and the second reference electrode, and the first gaps of the first reference electrode are staggered from the first gaps of the second reference electrode.

16. The phase shifter of claim 12, wherein the respective bridge floor of each of the plurality of membrane bridges comprises a connection portion, and a first end and a second end connected at opposite ends of the connection portion; orthographic projections of the first end and the second end on the first dielectric substrate are within orthographic projections of corresponding two of the plurality of reference sub-electrodes on the first dielectric substrate, respectively;

length directions of the first end and the second end are the same as a width direction of each of the corresponding two reference sub-electrodes, and a width direction of the connection portion is the same as the width direction of the reference sub-electrode; and orthographic projections of a long side, along the length direction, of the first end and a short side, along the width direction, of one reference sub-electrode of the two reference sub-electrodes on the first dielectric substrate overlap with each other, and orthographic projections of a long side, along the length direction, of the second end and a short side, along the width direction, of the other reference sub-electrode of the two reference sub-electrodes on the first dielectric substrate overlap with each other.

17. The phase shifter of claim 12, wherein the branch structures are connected to the main structure on a first side of the main structure close to the first reference electrode, an end surface of each of the branch structures away from the main structure is flush with an end surface of each of the plurality of reference sub-electrodes of the first reference electrode away from the main structure; or the branch structures are connected to the main structure on a second side of the main structure close to the second reference electrode, an end surface of each of the branch structures away from the main structure is flush with an end surface of each of the plurality of reference sub-electrodes of the second reference electrode away from the main structure.

18. The phase shifter of claim 12, wherein all of the plurality of reference sub-electrodes are formed in just the first reference electrode, widths of the first gaps are the same, and/or lengths of the plurality of reference sub-electrodes are the same; or all of the plurality of reference sub-electrodes are formed in just the second reference electrode, widths of the first gaps are the same, and/or lengths of the plurality of reference sub-electrodes are the same.

19. The phase shifter of claim 1, wherein the respective bridge floor of each of the plurality of membrane bridges comprises a connection portion, and a first end and a second end connected at opposite ends of the connection portion;

orthographic projections of the first end and the second end on the first dielectric substrate are within orthographic projections of corresponding two of the plurality of reference sub-electrodes on the first dielectric substrate, respectively;

length directions of the first end and the second end are the same as a width direction of each of the corresponding two reference sub-electrodes, and a width direction of the connection portion is the same as the width direction of the reference sub-electrode; and orthographic projections of a long side, along the length direction, of the first end and a short side, along the width direction, of one reference sub-electrode of the two reference sub-electrodes on the first dielectric substrate overlap with each other, and orthographic projections of a long side, along the length direction, of the second end and a short side, along the width direction, of the other reference sub-electrode of the two reference sub-electrodes on the first dielectric substrate overlap with each other.

20. An electronic device, comprising the phase shifter of claim 1.

* * * * *